United States Patent [19]

Baeger et al.

[11] Patent Number: 4,603,947

[45] Date of Patent: Aug. 5, 1986

[54] INDICATING DEVICE HAVING SPACER ELEMENT DISTRIBUTION TO COMPENSATE FOR EXPANSION

[75] Inventors: Holm Baeger, Schwalbach; Bernd Preiss, Hofheim, both of Fed. Rep. of Germany

[73] Assignee: VDO Adolf Schindling AG, Frankfurt am Main, Fed. Rep. of Germany

[21] Appl. No.: 581,770

[22] Filed: Feb. 21, 1984

[30] Foreign Application Priority Data

Mar. 2, 1983 [DE] Fed. Rep. of Germany ....... 3307333

[51] Int. Cl.⁴ .............................................. G02F 1/13
[52] U.S. Cl. .................................................. 350/344
[58] Field of Search ....................................... 350/344

[56] References Cited

U.S. PATENT DOCUMENTS 3,742,600  7/1973  Lowell ............................ 350/344 X
4,362,771  12/1982  Umeda et al. .................. 350/344 X Primary Examiner—John K. Corbin
Assistant Examiner—Richard F. Gallivan
Attorney, Agent, or Firm—Martin A. Farber

[57] ABSTRACT

An indicating device having a fluid which can be switched between two optically different states and which fills up a cell chamber formed between two transparent support plates which are parallel to each other. The support plates are held at a predetermined distance from each other by a plurality of spacer elements of given size, and they are each provided with an electrically conductive layer, which layers are located opposite each other. The volume of the cell chamber can be varied in accordance with a temperature-dependent change in the volume of the fluid filling it.

11 Claims, 2 Drawing Figures

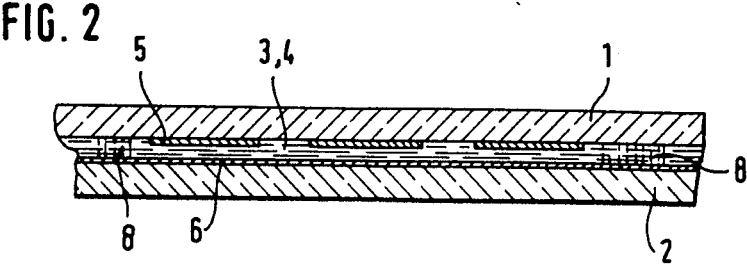
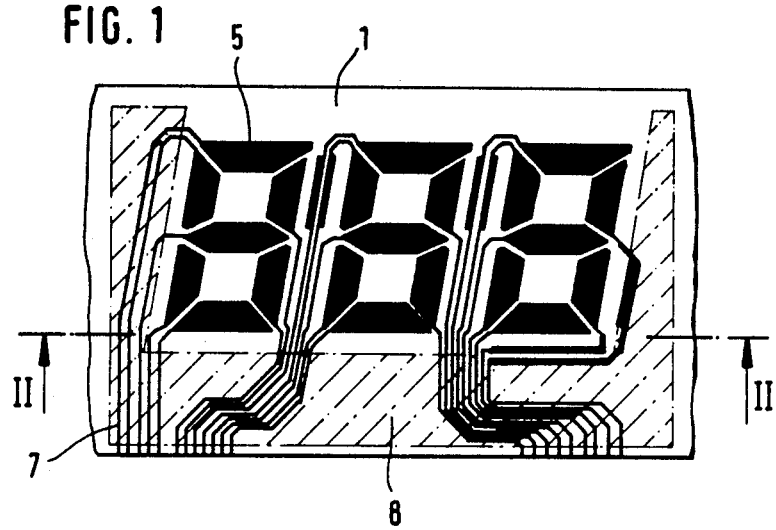

INDICATING DEVICE HAVING SPACER ELEMENT DISTRIBUTION TO COMPENSATE FOR EXPANSION

BACKGROUND OF THE INVENTION

The invention relates to an indicating device, particularly a liquid crystal display, having a fluid which can be switched between two optically different states and which fills a cell chamber formed between two transparent support plates which are parallel to each other, the support plates being held at a predetermined distance apart by a plurality of spacer elements of given size and being each provided with an electrically conductive layer, which layers are located opposite each other.

In such known indicating devices the spacer elements are distributed essentially uniformly over the entire surface of the support plates. They serve to keep the support plates at a given distance from each other since in the event of a reduction of this distance the operability of the indicating device is negatively affected. If such an indicating device, which may be a liquid crystal display, is subjected to very low temperatures, the fluid which is switchable between two optically different states, for instance a liquid-crystal material, contracts.

Since the support plates are held at a predetermined distance from each other by the spacer elements, the volume of the cell chamber remains the same while the volume of the liquid-crystal material is reduced. This leads to the formation of vacuum bubbles at unpredictable places within the cell chamber. If the vacuum bubble is located at a point opposite which there are electrically conductive layers by the control of which the liquid-crystal material can be switched in order to display indication symbols, then display of the indication symbols is not possible since no liquid-crystal material is present there any longer. The display fails.

The vacuum bubbles do break up, it is true, when the liquid-crystal material has again become heated to positive temperatures. However, this is not very helpful in various cases of use of such indicating devices. If such indicating devices are, for instance, installed in the instrument panel of automotive vehicles then they will fail during the entire winter season, particularly in regions having low winter temperatures. Displays in automotive vehicles must be operable at temperatures from −40° C. to +80° C.

The object of the present invention is, therefore, to create an indicating device in accordance with the introductory paragraph whose operability is assured over wide temperature ranges and, in particular, at low temperatures.

SUMMARY OF THE INVENTION

According to the invention, the volume of the cell chamber (3) is variable corresponding to a temperature-dependent change in the volume (4) of the fluid contained in it.

As a result of this development, vacuum bubbles can no longer form since the volume of the cell chamber can adapt itself to the volume of the fluid which is switchable between two optically different states. Low temperatures thus will no longer lead to a failure of the indicating device.

In one advantageous, simple development of the invention, the material of which the spacer elements is made can have approximately the same temperature coefficient as the optically switchable fluid (4). This has the result that, upon a decrease in the volume of the fluid, the two support plates move uniformly towards each other and thus can correspondingly adjust the volume of the cell chamber. Since the support plates move towards each other over their entire surface, there is sufficient change in volume with a slight movement towards each other, that the optical properties and thus the operability of the indicating device are not affected.

Another advantageous development of the invention, in which one of the support plates in the cell chamber has a surface which is free of an electrically conductive layer, provides that the surface which is free of conductive layer has a region (8) which is free of the spacer elements of given size, and has such a size that the support plates (1 and 2) are movable towards each other within this region. As a result, the support plates can move toward each other at defined places where no influence on the legibility of the indicating device is possible and can effect an adaptation of the volume of the cell chamber to the fluid. For this one preferably selects places where imprints of scalar graduations or legends are present on the support plates. Failure due to the formation of vacuum bubbles at low temperatures is thus reliably avoided.

In order to avoid too great an arching at given places of the region where the support plates can "breathe," spacers of smaller size than the spacer elements can be arranged in the region (8) of the support plate (1 or 2) which is free of the spacer elements of the given size.

For the same purpose it is possible that regions (8) which are free of spacer elements and are of large length and width be subdivided into individual regions by segments provided with spacer elements.

In order reliably to avoid affecting the function of the indicating device, the percentage of the region free of spacer elements with respect to the total area of the cell chamber (3) is a maximum of 50%, and preferably about 25%.

In order to secure the spacer elements at the places intended for them, the spacer elements and spacers can be fixed by a layer of fixative (1 or 2) applied to the support plate. This is done in simple manner by applying the fixative layer to the support plate (1 or 2) by a printing process.

If the spacer elements and/or the spacers consist of glass, there is practically no visible change in the optical properties of the indicating device.

As optically switchable fluid (4) a liquid-crystal material can preferably be employed.

BRIEF DESCRIPTION OF THE DRAWINGS

With the above and other objects and advantages in view, the present invention will become more clearly understood in connection with the detailed description of a preferred embodiment, when considered with the accompanying drawing, of which:

FIG. 1 shows an indicating device in top view; and
FIG. 2 shows the indicating device of FIG. 1 in cross section along the line II—II of FIG. 1.

DETAILED DESCRIPTION OF THE PREFERRED EMBODIMENT

The indicating device shown in the figures is a liquid-crystal display with a front transparent support plate 1 and a rear transparent support plate 2. The two support plates 1 and 2 are arranged parallel to each other at a given distance apart and form between each other a cell chamber 3, which is filled with a fluid 4 which can be switched between two optically different states, for instance a liquid-crystal material. The rear support plate 2 is provided with an electrically conductive layer 6 which covers its entire surface, while the front support plate 1 is provided, corresponding to the pattern which can be noted in FIG. 1, with an electrically conductive layer consisting of three seven-segment electrodes 5.

The electrically conductive layer 6 and the seven-segment electrodes 5 can be controlled, via connecting electrodes 7, for the optical switching of the fluid 4.

With the exception of the hatched region 8, a plurality of spacer elements of given size (not shown) are distributed uniformly between the support plates 1 and 2 in order to hold the two support plates 1 and 2 at a predetermined distance apart.

The region 8 is of such size and extent that the support plates can move towards each other in this region 8 when the fluid 4 contracts within the cell chamber 3 as a result of low temperatures. At the same time, outside the region 8, the support plates 1 and 2 are held at the predetermined given distance apart by the spacer elements, so that there is no impairment of the operability of the indicating device.

An example of a suitable liquid is the liquid-crystal material ZLI 1565 from the German company Merck in Darmstadt. A spacer material corresponding to this liquid is the polyester "Dacron" from Dupont. Both materials have a temperature coefficient of expansion of about $7 \times 10^{-4}/°C$. at 20° C.

We claim:

1. In an indicating device, particularly a liquid crystal display, having a fluid which can be switched between two optically different states and which fills a cell chamber formed between two transparent support plates which are parallel to each other, the support plates being held at a predetermined distance apart by a plurality of spacer elements of given size, and the support plates being each provided with an electrically conductive layer, which layers are located opposite each other, the improvement wherein
   said spacer elements are dispersed about a part of said chamber and being omitted from the remainder of said chamber, thereby permitting the volume of the cell chamber to be variable corresponding to a temperature-dependent change in the volume of the fluid contained therein.

2. The device according to claim 1, wherein
   the optically switchable fluid is a liquid-crystal material.

3. In an indicating device, particularly a liquid crystal display, having a fluid which can be switched between two optically different states and which fills a cell chamber formed between two transparent support plates which are parallel to each other, the support plates being held at a predetermined distance apart by a plurality of spacer elements of given size, and the support plates being each provided with an electrically conductive layer, which layers are located opposite each other, the improvement wherein
   the volume of the cell chamber is variable corresponding to a temperature-dependent change in the volume of the fluid contained therein,
   the optically switchable fluid has a temperature coefficient of expansion, and the material of which the spacer elements is made has a temperature coefficient of expansion which is approximately the same as the temperature coefficient of the optically switchable fluid.

4. In an indicating device, particularly a liquid crystal display, having a fluid which can be switched between two optically different states and which fills a cell chamber formed between two transparent support plates which are parallel to each other, the support plates being held at a predetermined distance apart by a plurality of spacer elements of given size, and the support plates being each provided with an electrically conductive layer, which layers are located opposite each other, the improvement wherein
   the volume of the cell chamber is variable corresponding to a temperature-dependent change in the volume of the fluid contained therein,
   one of the support plates in the cell chamber has a surface which is free of an electrically conductive layer, the surface which is free of the conductive layer having a region which is free of spacer elements of a given size, and
   the surface which is free of the conductive layer having such a size that the support plates are movable towards each other within this region.

5. The device according to claim 4, further comprising
   spacers of smaller size than the spacer elements of said given size and arranged in the region of a support plate which is free of the spacer elements of said given size.

6. The device according to claim 5, wherein
   the spacer elements and spacers are fixed by a layer of fixative applied to the support plate.

7. The device according to claim 6, wherein
   the fixative layer is applied to a support plate by a printing process.

8. The device according to claim 6, wherein
   the spacer elements and/or the spacers are made of glass.

9. The device according to claim 4, wherein
   regions which are free of spacer elements and are of large length and width are separated from other such regions by segments of the support plates which are provided with spacer elements.

10. The device according to claim 4, wherein
    the percentage of the region free of spacer elements with respect to the total area of the cell chamber is a maximum of 50%.

11. The device according to claim 4, wherein
    the percentage of the region free of spacer elements with respect to the total area of the cell chamber is about 25%.

* * * * *